April 27, 1948. H. W. DODSON 2,440,254
CHAIN AND METHOD AND APPARATUS FOR FORMING SAME
Filed July 14, 1944 3 Sheets-Sheet 1
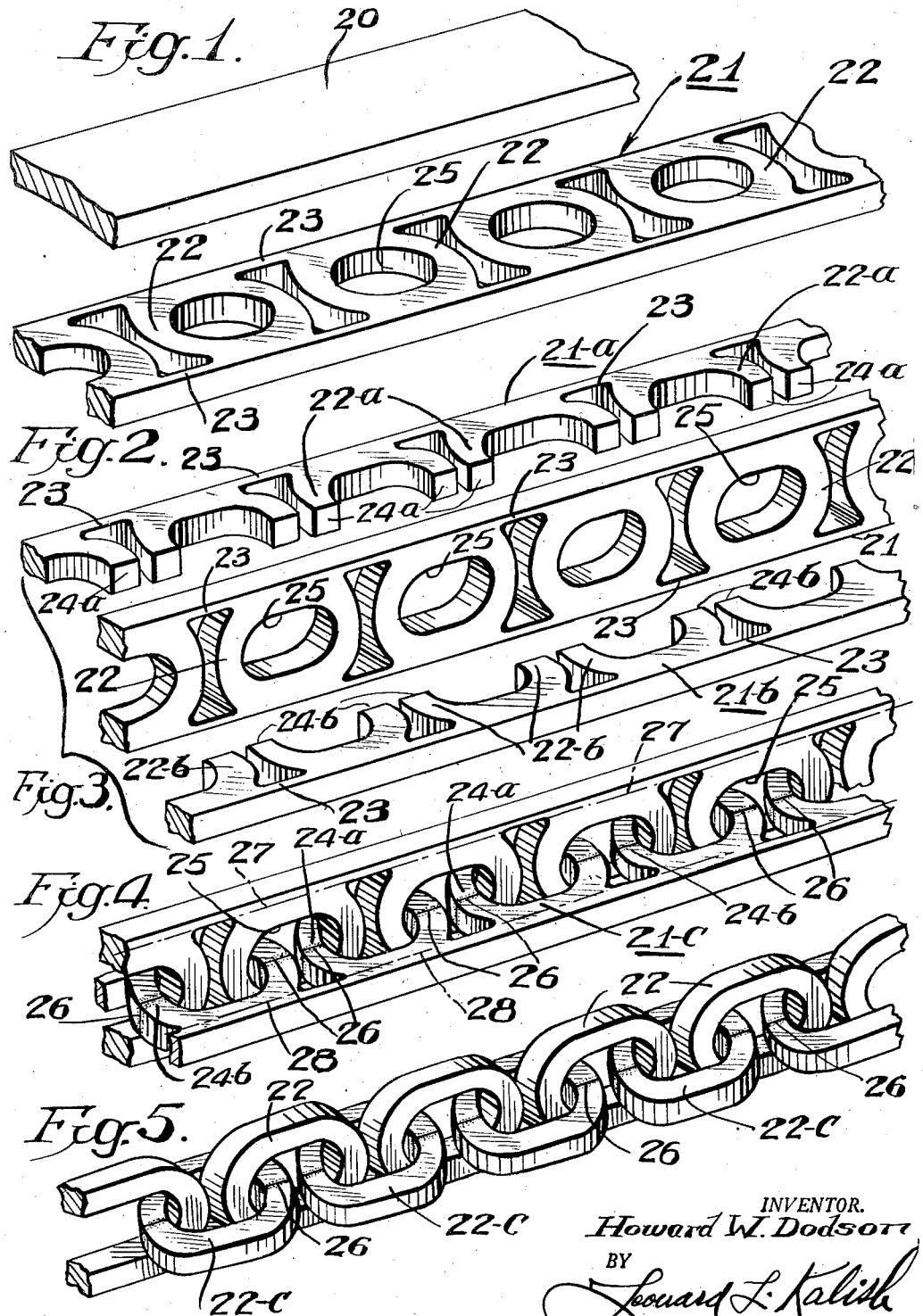
INVENTOR.
Howard W. Dodson
BY
Leonard L. Kalish
Attorney

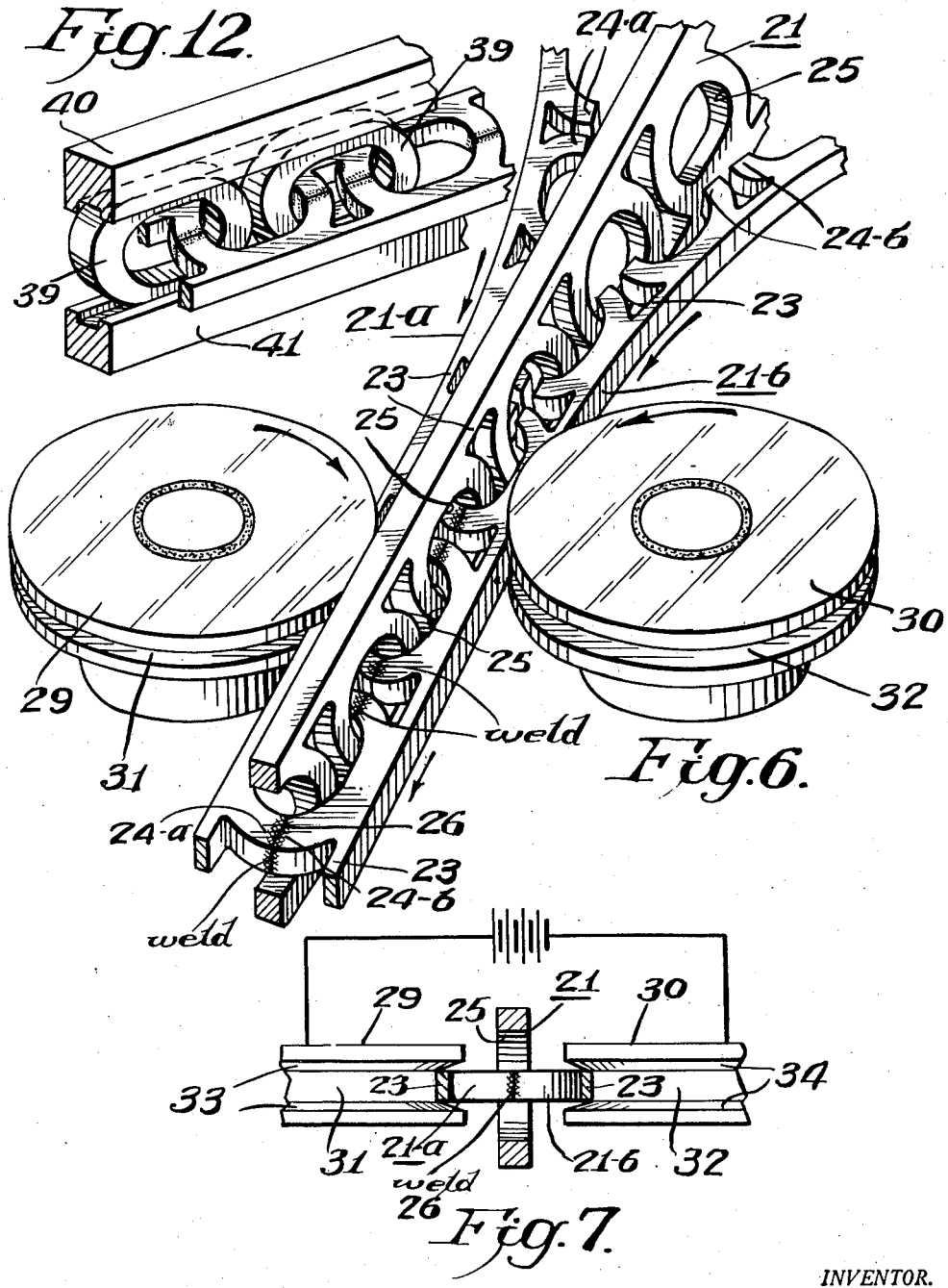

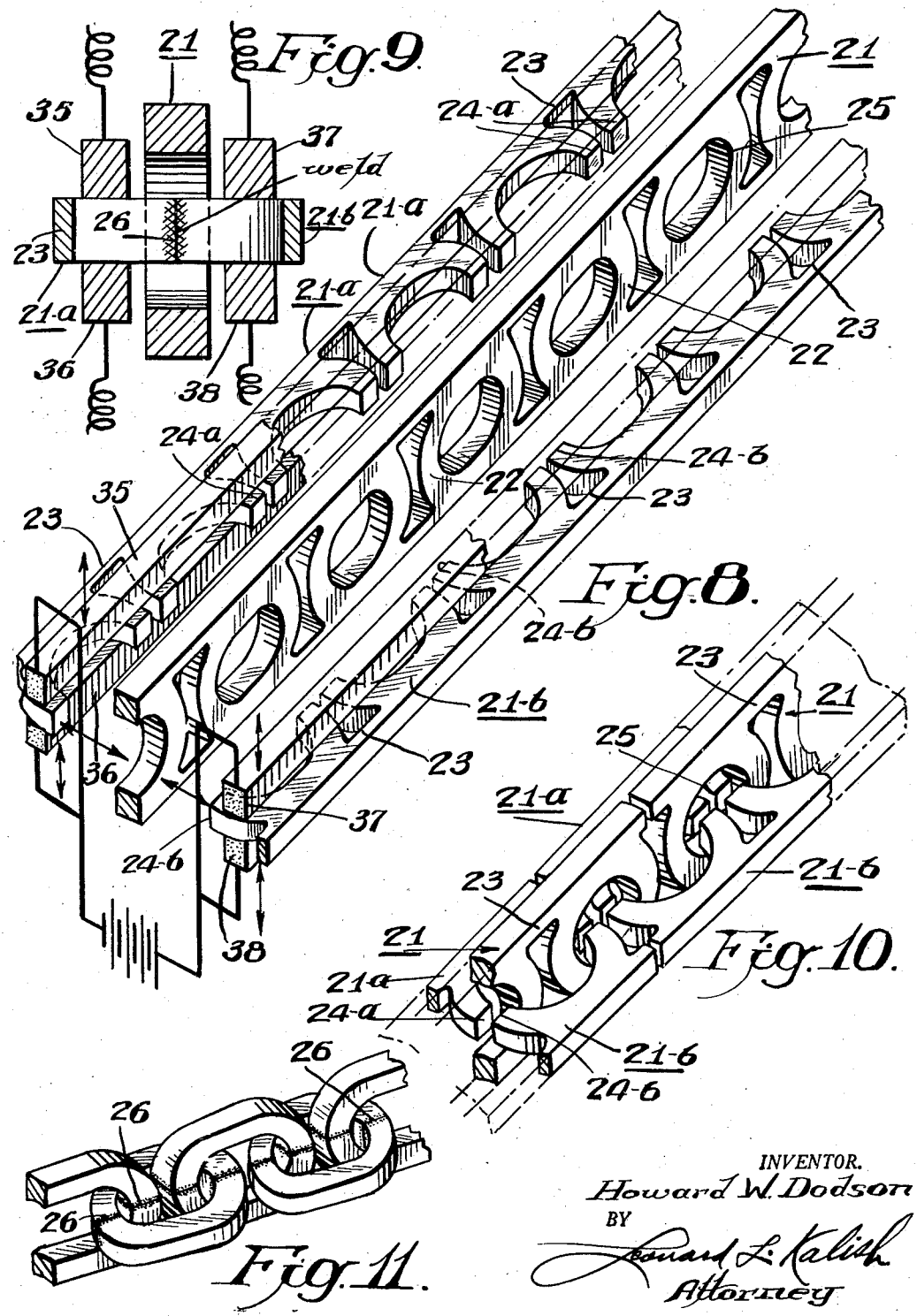

Patented Apr. 27, 1948

2,440,254

UNITED STATES PATENT OFFICE 2,440,254

CHAIN AND METHOD AND APPARATUS FOR FORMING SAME

Howard W. Dodson, Yeadon, Pa., assignor to United Steel Barrel Company, Philadelphia, Pa., a corporation of Pennsylvania Application July 14, 1944, Serial No. 544,907

9 Claims. (Cl. 59—35)

The present invention relates to chains and methods and apparatus for forming same and it relates more particularly to chains formed from sheet-metal or the like and methods and apparatus for forming same.

An object of the present invention is to provide a new and improved chain construction. Another object of the present invention is to provide a chain which can be quickly and inexpensively formed from sheet-metal or the like. Still another object of the present invention is to provide a new and improved chain which can be quickly and inexpensively formed from strips of sheet-metal or the like by simple stamping, cutting and welding operations. A further object of the present invention is to provide a method of and apparatus for carrying out the foregoing objects.

Other objects and advantages of the present invention will be apparent in the following detailed description, appended claims and accompanying drawings.

In the past, it has been conventional to make chains by bending chain link stock (usually of circular cross-section) to form a plurality of individual links of desired form and dimension; the links being shaped with open scarfed ends. The scarfed ends are then heated to welding temperature whereupon the links are assembled one at a time and each is thereafter welded by a fire weld; that is, by bringing the heated scarfed ends together and forging them by rapid hammering action while they are at the welding temperature.

The chains produced by such conventional methods heretofore employed have been relatively expensive to produce and have required complicated bending and forging apparatus as well as requiring the relatively expensive chain link stock.

Accordingly, the present invention contemplates a new and improved chain construction wherein the chain can be quickly and inexpensively formed from inexpensive strips of sheet-metal or the like by simple stamping, cutting and welding operations which can be carried out by relatively simple inexpensive and easily procurable apparatus.

Generally speaking, the present invention comprehends a chain assembled from two elongated strips of sheet-metal or the like, each of which is stamped from a plain flat "blank," by simple cutting and welding operations as will be hereinafter described.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a fragmentary perspective view of a thin flat "blank" or strip of sheet-metal or the like from which the novel chain construction of the present invention can be formed.

Figure 2 represents a fragmentary perspective view of a strip stamped from the "blank" of Figure 1; the strip having a series of longitudinally-disposed links connected at their sides by integral webs.

Figure 3 represents a fragmentary perspective view showing a further stage in the formation of the novel chain construction of the present invention; one of the stamped strips similar to that of Figure 2 being shown as having been longitudinally cut to provide a pair of half-strips which are arranged on either side of an uncut strip and at right angles thereto; the half-strips being arranged so that the cut ends of their half-links are in line with the openings of the links of the uncut strip.

Figure 4 represents a fragmentary perspective view showing a still further advanced stage in the forming operation wherein the cut half-strips of Figure 3 have been brought together with the ends of the cut links abutting each other within the openings of the links of the uncut strip and wherein the abutting ends have been flash-welded to re-unite the half-strips into a more or less integral structure interengaged with the uncut strip.

Figure 5 represents a fragmentary perspective view of the final chain structure formed by trimming off the connecting webs of the united strips of Figure 4.

Figure 6 represents a more or less schematic perspective view showing one method of continuously flash-welding the cut half-strips by passing the strips between welding rolls.

Figure 7 represents a cross-sectional view of the embodiments of Figure 6.

Figure 8 represents a more or less schematic fragmentary perspective view showing an alternate method of flash-welding the half-strips.

Figure 9 represents a cross-sectional view of the embodiment of Figure 8 but showing the parts in welding position.

Figure 10 represents a perspective view showing the manner in which consecutive lengths of strips and half-strips can be connected to form a continuous chain.

Figure 11 represents a perspective view of another embodiment of the present invention wherein the chain is made up entirely of cut and welded links.

Figure 12 represents a perspective view showing an intermediate step in the formation of a chain from individual links and webbed half-strips.

Referring now to Figures 1 to 5, in forming the novel chain construction of the present invention, I may start with a flat elongated strip or "blank" 20 of sheet-metal or the like shown in Figure 1. The blank 20 may vary considerably in thickness and transverse dimension depending upon the size of the final chain to be formed. Thus, for example, where small chains are to be formed, the blank 20 may be a relatively thin strip of sheet-metal having a thickness of 1/8" or less. On the other hand, where large size chains are to be formed, the blank 20 may be a strip of rolled steel or the like several inches or more in thickness.

The blank 20 may be of any appropriate length. Where the strip is relatively thin, so that it is flexible and can be rolled up, it may be of considerable length and may be mounted on a reel or spool from which it can be fed to the subsequent stamping and forming operations to be hereinafter described.

Where the blank 20 is relatively thick (so that it cannot be wound on a spool or reel), its length can be as great as industrial roll-mill operations will permit.

From the blank 20, there is next punched or stamped a strip 21 shown in Figure 2. The punched strip 21 can be formed from the blank 20 by any conventional punch press (not shown) equipped with suitably shaped dies.

The strip 21 includes a series of longitudinally-spaced links 22 which are integrally connected by webs 23 extending along the side edges of the strip.

In forming the novel chain of the present invention, two strips 21 like that shown in Figure 2 are employed. One strip 21 is used as is and the other strip is longitudinally cut (through the links thereof) by any suitable cutting machine (not shown) to provide a pair of half-strips 21—a and 21—b as shown in Figure 3.

The half-strips 21—a and 21—b are then positioned on either side of the uncut strip 21 and generally at right angles thereto as shown in Figure 3; the cut ends 24—a and 24—b of the half-links 22—a and 22—b of the half-strips 21—a and 21—b being positioned so that they are opposite each other and are in line with the openings 25 of the links 22. The half-strips 21—a and 21—b are then brought together so that the cut ends 24—a and 24—b abut one another within the openings 25 of the links 22.

The abutting ends 24—a and 24—b are then electrically flash-welded together as shown in Figure 4 to re-unite the half-strips 21—a and 21—b into a more or less integral strip 21—c which is inter-connected with the uncut strip 21; the weld zones 26 of the strip 21—c being within the openings 25 of the links 22. The strip 21 is then trimmed off at its side edges generally along the dotted line 27 shown in Figure 4 and the welded strip 21—c is similarly trimmed off at its side edges along the dotted line 28 shown in Figure 4.

The edges of the strips 21 and 21—c can be trimmed off along the lines 27 and 28 respectively by any conventional press or other forming machine (not shown) equipped with suitable cutting dies. When the strips 21 and 21—c are so cut, the connecting webs 23 and 23—c respectively thereof are cut off so that the links 22 of the strip 21 and the links 22—c of the strip 21—c are freed as shown in Figure 5 to give the final chain structure.

If desired, the cutting dies for cutting off the webs 23 can be so formed as simultaneously to round off the edges of the links by swaging or otherwise to eliminate sharp corners thereon. Alternatively, the sharp edges of the final chain structure can be rounded off by rumbling the links in a tumbling barrel.

The strips 21 and 21—c can be trimmed simultaneously to remove their webs or, instead, each of the strips can be trimmed separately.

In Figures 6 and 7 I have shown, in more or less schematic form, one form of apparatus for continuously flash-welding the cut ends 24—a and 24—b of the half-strips 21—a and 21—b respectively to produce the final welded strip 21—c.

In this embodiment, I may provide a pair of juxtaposed welding rolls 29 and 30 having annular grooves 31 and 32 formed thereon. The annular grooves 31 and 32 may be provided with tapered side walls 33 and 34 respectively; the clearance between the rolls 29 and 30 being such that, when the half-strips 21—a and 21—b are passed therethrough, the sides of the half-strips will be wedged tightly into the grooves 31 and 32 to provide firmer support and better electric contact therebetween.

The welding rolls 29 and 30 are then made the terminals of an electrical welding circuit as shown diagrammatically in Figure 7. The welding rolls 29 and 30 are then rotated slowly by any conventional driving means (not shown) to pull the half-strips 21—a and 21—b therebetween as shown in Figure 6. The low-voltage high-amperage welding current passes between the welding rolls 29 and 30 and through the intervening portions of the half-strips 21—a and 21—b thereby generating heat at the abutting cut ends 24—a and 24—b to produce a strong weld therebetween as is well known in the art. That is, each successive pair of abutting ends 24—a and 24—b is flash-welded as it comes intermediate the welding rolls 29 and 30.

As can be seen in Figure 6, the half-strips 21—a and 21—b are fed to the welding rolls 29 and 30 along converging paths; the uncut strip 21 being fed intermediate the half-strips 21—a and 21—b so as to permit the cut ends 24—a and 24—b to meet within the openings 25 as hereinabove described.

Instead of having the welding rolls 29 and 30 power-driven, these rolls may be idler rolls and the strips may be pulled through the rolls by any conventional mechanism (not shown).

In Figures 8 and 9 I have shown, schematically, alternative apparatus for welding the half-strips 21—a and 21—b in place.

In this embodiment, the half-strip 21—a is first gripped by upper and lower elongated electrically-conducting bars 35 and 36 so that the cut ends 24—a protrude inwardly therefrom; the bars 35 and 36 being adapted for vertical up-and-down movement by means of any conventional mechanism (not shown). The other half-strip 21—b is similarly gripped by upper and lower bars 37 and 38.

The bars 35 and 36 are connected to one terminal of a low-voltage high-amperage electrical welding circuit and the bars 37 and 38 are connected to the other terminal of the circuit.

The bars 35—36 and 37—38 are also adapted for horizontal movement by any suitable mechanism (not shown) so that, after the half-strips 21—a and 21—b have been grasped, the bars are moved inward and toward each other until the protruding cut ends 24—a and 24—b abut within the openings 25 of the uncut strip 21 (as shown in Figure 9); the strip 21 being maintained in upright position intermediate the half-strips by any suitable mechanism (not shown).

When the cut ends 24—a and 24—b abut, the low-voltage high-amperage welding current will pass therethrough throughout the length of the bars 35—36 and 37—38 so that all of the abutting ends 24—a and 24—b held by said bars are simultaneously flash-welded as shown in Figure 9.

The individual bars 35 and 36 and 37 and 38 are then moved apart vertically to release the welded section 21—c whereupon the interconnected sections 21 and 21—c are moved by any suitable mechanism (not shown) to permit the next length of half-strips to be welded in position.

It is apparent that a chain of indefinite length can be made by connecting the ends of relatively short sections 21 and half-sections 21—a and 21—b in the manner shown in Figure 10. That is, if the sections 21 and the half-sections 21—a and 21—b are terminated at their connecting webs 23 and 23—c respectively, the welding of the last pairs of cut ends 24—a and 24—b automatically interconnect the consecutive strips and half-strips.

Instead of stamping the whole strips 21 out of the blanks 20, it is possible to stamp half-strips out of blanks having smaller transverse dimensions. That is, it is possible to stamp a half-strip 21—a or 21—b directly out of an appropriately-sized blank instead of forming these half-strips by longitudinally cutting a whole strip 21.

These directly-punched half-strips can be used in conjunction with whole strips 21 as shown in Figure 3 or, alternatively, four of such directly-punched half-strips can be used to make up the chain as shown in Figure 11. That is, another pair of vertically-disposed half-strips may be used in place of the whole strip 21 of Figure 3 and may be flash-welded together as described hereinabove. In other words, the two perpendicularly-arranged pairs of opposed half-strips can be flash-welded to form the chain. In this case, the chain would be made up entirely of welded links as shown in Figure 11, instead of the alternate welded and integral links shown in Figure 5.

In Figure 12, I have shown an intermediate step in an alternative method of constructing the novel chain of the present invention.

In this embodiment, individual links 39 are punched from any suitable blank of sheet-metal or the like; each of the links 39 being integral and continuous and uncut and being disconnected from the other links.

The individual links 39 are then positioned in spaced alignment between suitable grooved clamping jaws 40 and 41 as shown in Figure 12 and a pair of half-strips 21—a and 21—b are flash-welded into engagement therewith. The connecting webs of the welded strip are then trimmed off as hereinabove described to free the welded links and to provide a final chain generally identical with that shown in Figure 5.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent is:

1. A method of forming a chain which comprises punching elongated strips from blanks of sheet-metal or the like, each of said strips including a plurality of longitudinally-spaced links integrally connected by pairs of lateral webs; longitudinally cutting one of said strips to provide a pair of half-strips, each of said half-strips including a plurality of half-links integrally connected by a lateral web; positioning said half-strips on either side of and generally at right angles to a whole strip so that the cut ends of the half-links of the respective half-strips abut one another generally within the links of the whole strip; passing an electrical welding current through said abutting cut ends thereby to weld them together and to re-unite the half-strips in interlocking engagement with the whole strip; and trimming the connecting webs from the whole strip and the welded strip, thereby to free the links thereof and to provide a chain having alternate integral and uncut links and intervening welded links.

2. A method of forming a chain which comprises punching an elongated strip from a blank of sheet-metal or the like, said strip including a plurality of longitudinally-spaced links integrally connected by webs; forming a pair of half-strips from sheet-metal or the like, each of said half-strips including a plurality of half-links integrally connected by webs; positioning said half-strips on either side of and generally at right angles to the whole strip so that the ends of the half-links of the respective half-strips abut one another generally within the links of the whole strip; passing an electrical welding current through said abutting ends thereby to weld them together and to unite the half-strips into a whole strip disposed in interlocking engagement with the integral strip; and trimming the connecting webs from the integral strip and the welded strip, thereby to free the links thereof and to provide a chain having alternate integral links and intervening welded links.

3. A method of forming a chain which comprises forming two pairs of elongated half-strips from blanks of sheet-metal or the like, each of said half-strips including a plurality of longitudinally-spaced half-links integrally connected by webs; juxtapositioning said pairs of half-strips with the ends of the half-links in abutting relationship, the pairs of half-strips being disposed generally at right angles to each other with the abutting ends of the half-links of each pair of half-strips generally enclosed within the half-links of the other pair of half-strips; passing an electrical welding current through the abutting ends of the half-links of each pair of half-strips thereby to weld them together and to unite the pairs of half-strips into two interlocked whole strips; and trimming the connecting webs from each of the said welded strips, thereby to free the links thereof and to provide a chain having links each made up of a pair of welded sections.

4. A method of forming a chain which comprises forming a pair of half-strips of sheet-metal or the like, each of said half-strips including a plurality of longitudinally-spaced half-links integrally connected by lateral webs; maintaining a plurality of chain links in longitudinally-spaced alignment; positioning said half strips so that the ends of their respective half-links are disposed in abutting relationship generally within said chain links; electrically-welding the abutting ends of said half-links thereby to unite said half strips; trimming the connecting webs from the welded strips; and freeing said chain links thereby to provide a chain wherein alternate links are made up of welded sections.

5. A method of forming a chain which comprises forming a pair of half-strips of sheet-metal or the like each including a plurality of longitudinally-spaced half-links integrally connected by a lateral web; passing said half-strips between welding rolls in inter-meshing relationship with a series of interconnected chain links, the ends of the half-links of said half-strips being disposed in abutting relationship generally within the chain links, thereby progressively to weld said abutting ends and to unite said half-strips; trimming the connecting webs from the welded strips; and freeing the chain links, thereby to provide a chain wherein alternate links are formed of welded half-sections.

6. A method of forming a chain which comprises punching elongated strips from blanks of sheet-metal or the like, each of said strips including a plurality of longitudinally-spaced links integrally connected by pairs of lateral webs; longitudinally cutting one of said strips to provide a pair of half-strips, each of said half-strips including a plurality of half-links integrally connected by a lateral web; feeding said half-strips between welding rolls with the cut ends of the half-links in abutting relationship generally within the links of the whole strip, thereby progressively to weld said abutting ends and to reunite the half-strips; and trimming the connecting webs from said strips thereby to free the links and to provide a chain wherein alternate links are formed of welded half-sections.

7. For forming a chain or the like, means for punching elongated strips from blanks of sheet-metal or the like, each of said strips including a plurality of longitudinally-spaced links integrally connected by pairs of lateral webs; means for longitudinally cutting a strip thereby to provide a pair of half-strips each including a plurality of half-links integrally connected by a lateral web; means for electrically flash-welding the cut ends of the pair of half-links in intermeshing engagement with the links of an uncut strip; and means for trimming the connecting webs from said strips, thereby to free the links.

8. For forming a chain or the like, means for punching elongated strips from blanks of sheet-metal or the like, each of said strips including a plurality of longitudinally-spaced links integrally connected by pairs of lateral webs; means for longitudinally cutting a strip thereby to provide a pair of half-strips each including a plurality of half-links integrally connected by a lateral web; means for progressively flash-welding the abutting cut ends of the half-strips in intermeshing engagement with the links of the uncut strip, said last-mentioned means including a pair of juxtaposed channeled welding rolls adapted to contact the lateral edges of the half-strips and to hold the cut edges of the half-links in abutting relationship; and means for trimming the connecting webs from said strips, thereby to free the links.

9. For forming a chain or the like, means for punching elongated strips from blanks of sheet-metal or the like, each of said strips including a plurality of longitudinally-spaced links integrally conected by pairs of lateral webs; means for longitudinally cutting a strip thereby to provide a pair of half-strips each including a plurality of half-links integrally connected by a lateral web; means for electrically flash-welding the cut ends of the half-links of said half-strips in inter-engagement with the links of the uncut strip, said last-mentioned means including opposed clamp-bars adapted to grip each of said half-strips with the cut ends of the half-links protruding inwardly therefrom, means for bringing the gripped half-strips together whereby the cut ends of said half-links are brought into abutting relationship within the links of the uncut strip, and means for passing an electrical welding current from said clamp-bars through the abutting cut ends thereby to weld said ends together; and means for trimming the connecting webs from said strips, thereby to free the links.

HOWARD W. DODSON.

REFERENCES CITED

The following references are of record in the file of this patent:

UNITED STATES PATENTS

| Number | Name | Date |
| --- | --- | --- |
| 1,833,444 | Stuller | Nov. 24, 1931 |
| 2,242,164 | Barstow | May 13, 1941 |
| 1,972,297 | Hall | Sept. 4, 1934 |
| 2,260,630 | McKinnon et al. | Oct. 18, 1941 |
| 1,962,291 | Anderson | June 12, 1934 |
| 2,260,629 | McKinnon | Oct. 28, 1941 |